Nov. 4, 1958
C. W. KING
2,859,358
CONTROL CIRCUIT
Filed May 23, 1956
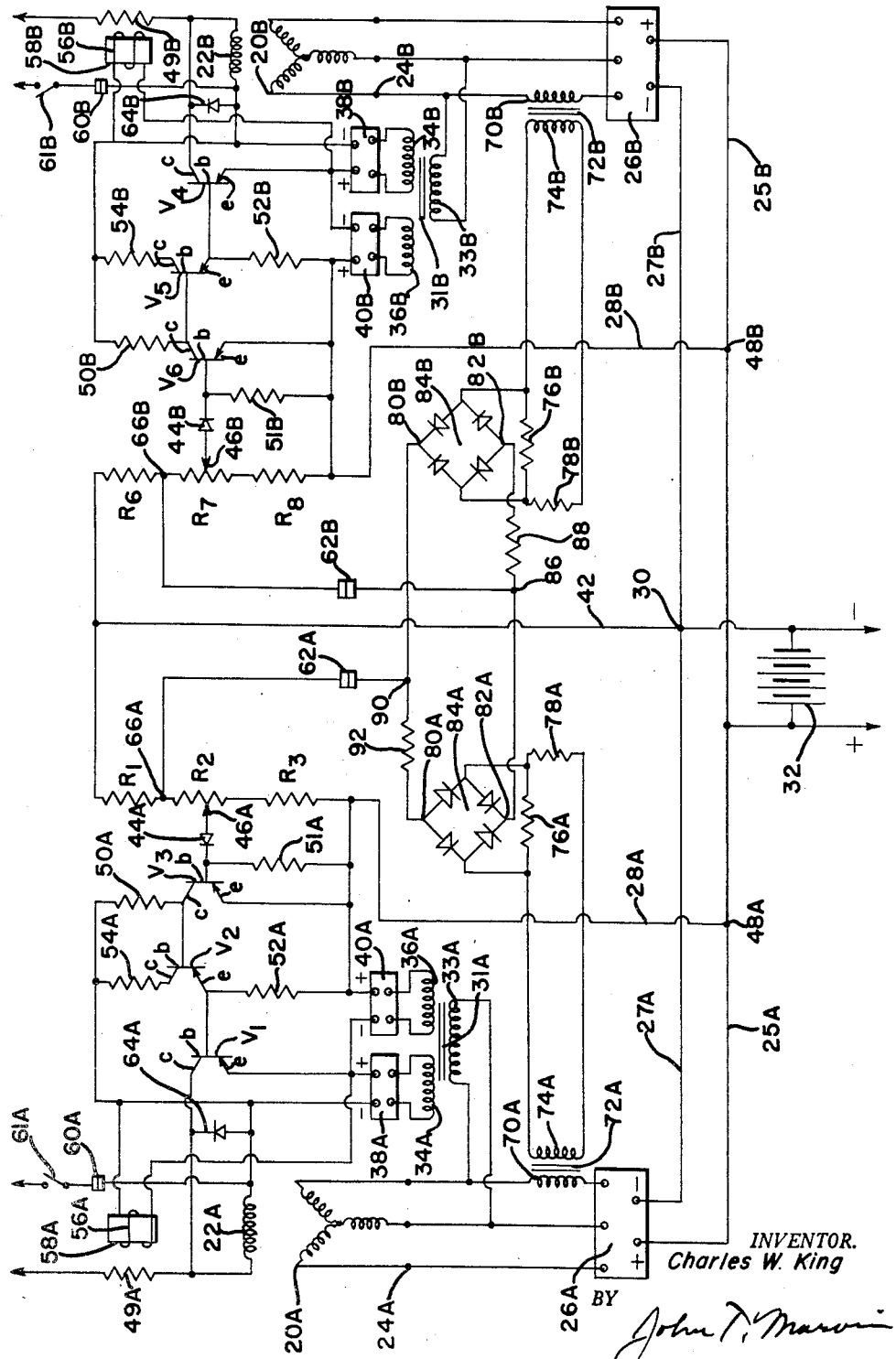
INVENTOR.
Charles W. King
BY
John T. Marvin
Attorney

United States Patent Office 2,859,358
Patented Nov. 4, 1958

2,859,358

CONTROL CIRCUIT

Charles W. King, Anderson, Ind., assignor to General Motors Corporation, Detroit, Mich., a corporation of Delaware Application May 23, 1956, Serial No. 586,744

11 Claims. (Cl. 307—57)

This invention relates to alternator voltage regulation and more particularly to a method and circuit network to individually control the output voltages of two alternators that are connected in parallel through rectifiers to a common direct current circuit.

It is an object of the present invention to individually control the fields of two variable speed alternators that are connected in parallel so the output of the alternators will be substantially equal.

Another object of the present invention is to individually control the field currents of two alternators with separate voltage regulators and to interconnect the regulators so the output of the alternators will be substantially equal when the alternators have their output terminals connected in parallel to a common direct current circuit.

A further object of the present invention is to individually control the fields of two alternators with individual transistorized voltage regulators and to interconnect said regulators so the output of the two alternators will be substantially equal when the alternators are connected in parallel to supply a common direct current circuit.

In carrying out the above objects, it is a further object to vary the control of a voltage regulator on the exciting field of an alternator by a means that includes a pair of rectifiers that are interconnected with each other and in circuit with the output terminals of two alternators connected for parallel operation and with the voltage regulator for each of the alternators.

A still further object of the present invention is to maintain the outputs of at least two alternators substantially equal when the alternators are connected in parallel to supply a common direct current circuit with power. This object is accomplished by individually controlling the fields with individual voltage regulators, each of which includes a voltage divider, a voltage sensitive diode and transistors, and to interconnect the voltage dividers through rectifiers that are interconnected with each other and are individually energized from individual transformers which are individually connected to the output terminals of the alternators.

Further objects and advantages of the present invention will be apparent from the following description, reference being had to the accompanying drawing wherein preferred embodiments of the present invention are clearly shown.

In the drawings:

The single figure shows a circuit for paralleling transistorized voltage regulators according to the present invention.

In the drawing, a pair of alternators 20A and 20B are shown. These alternators are each connected to circuits which are duplicates of each other and, therefore, whenever possible the circuit for only one of the alternators will be described to avoid needless duplication of the specification. The circuit described for the alternator 20 will apply to the circuits for the both alternators 20A and 20B as will be hereinafter apparent.

The alternator 20 has its output terminals 24 connected to the input terminals of a rectifier 26. The positive output terminals of the rectifiers 26A and 26B are connected to leads 25A and 25B, respectively, which are connected together and to the positive terminal of a battery 32, which may also be connected with a D. C. load. The negative terminal of the rectifiers 26A and 26B are connected through leads 27A and 27B to a junction 30. Junction 30 is connected to the negative terminal of the battery 32. Connected across the output terminals of rectifier 26A by leads 28A and 42 is a voltage divider which consists of resistances $R_1$, $R_2$ and $R_3$. Connected across the output leads of rectifier 26B by leads 28B and 42 is a voltage divider which consists of resistances $R_6$, $R_7$ and $R_8$. The voltage divider resistances are connected in series from junctions 48A and 48B through a common lead 42 to junction 30.

While the alternators 20 are shown as having Y-connected windings, it is apparent that the alternators may be of the single or multiple phase types, and, if desired, may be of the delta wound types. These alternators are well known and each have an exciting field winding 22, the energization of which will be controlled by a voltage regulator as will be hereinafter described.

A transformer 31 has its primary coil winding 33 connected across two of the output leads of the alternator. This transformer has a pair of secondary coil windings 34 and 36, which are respectively connected to rectifiers 38 and 40.

A voltage sensitive diode 44 is connected to an adjustable tap 46 on each of the resistances $R_2$ and $R_7$. These diodes are of the Zener type. The function of a Zener type diode is set forth in application, S. N. 586,787, concurrently filed herewith. This application has been assigned to the assignee of the present invention. The diodes 44 will each be conductive when the voltage drop between a junction 48 and the tap 46 exceeds a predetermined value. The transistors $V_1$, $V_2$, $V_3$, $V_4$, $V_5$ and $V_6$ are of the PNP type, that is, they will become conductive when the base "b" is negative with respect to the emitter "e" and when the emitter is positive with respect to the collector "c." When the base of the transistor is negative with respect to the emitter, the current will flow between the emitter and the collector "c." The amount of current flow between the emitter and collector will be proportional to the voltage difference between the emitter and base of the transistor. When the diode 44 becomes conductive, current will flow from junction 48, through the resistance 51, the diode 44 and tap 46. This will cause the base of transistor $V_3$ to be made negative relative to its emitter. Transistor $V_3$ will thus be made conductive and will cause current through resistance 50 to increase. When current increases in resistance 50, the base of transistor $V_2$ will become more positive relative to its emitter. Transistor $V_2$ will thus be made less conductive and the current flow through resistances 52 and 54 is decreased. The decrease in current flow through resistance 52 will cause the base of transistor $V_1$ to become more postitive relative to the emitter of $V_1$ and correspondingly cause a decrease in current between the emitter and collector of transistor $V_1$. The emitter and collector of transistor $V_1$ is in series with the field 22, of the alternator 20, so, as the current flow through transistor $V_1$ is reduced, the energization of the field 22 is decreased. The decrease in energization of the alternator field, of course, will lower the output voltage of the alternator.

From the drawing it will be seen that suitably connected across field 22 are a pair of leads, one of which contains a pair of normally closed contacts 60. These leads are connected through a suitable on-off switch 61 and a resistance 49 with a suitable source of D. C. current, not shown, as a storage battery. This arrangement will permit the field 22 to be excited from an external D. C. current source until the alternator 20 is developing a sufficient output to render the system self-exciting. When the alternator output reaches a sufficient value, the coil 56 of relay 58 which is connected across the output terminals of rectifier 38 will cause the contacts 60 to open and break the circuit between the field 22 and external D. C. current and voltage source.

The paralleling relay contacts 62 are designed to close when a particular alternator has reached a predetermined output. This is accomplished by connecting the paralleling relay coil, not shown, across the output terminals of rectifier 38. In this manner, the paralleling circuit of an alternator is functional only when its alternator is operating. The rectifier 64 is a blocking rectifier used to provide a path for any induced voltage in the field to dissipate itself, thus protecting transistor $V_1$. The paralleling circuit for the two alternators will now be described. In this connection, it is to be noted that another type of paralleling circuit and a complete description of another circuit network for controlling the field of the alternators when they are in parallel is set forth in the application mentioned supra.

When the two alternators 20A and 20B are connected in parallel to supply the same battery and load, there will be an unequal division of alternator loads unless the regulator means heretofore described are adjusted to operate at the same voltage or some method of parallel is incorporated. Generally, regulators are adjusted to operate at different voltages and for that reason some method of paralleling must be used to obtain an approximately equal division of the alternator loads.

For purposes of explanation, assume the regulator associated with alternator 20A is adjusted to operate at a higher voltage than the regulator associated with alternator 20B. When the alternators 20A and 20B are connected to operate in parallel as shown, the output voltage will be the same between leads 25 and 27. The difference in the adjustment of the regulator means will show up in an unbalanced load with the alternator 20A supplying the greater percent of the load to the common D. C. load circuit. With this condition, the primary winding 70A of transformer 72A will be subjected to more current than the primary winding 70B of transformer 72B. Windings 70A and 70B are connected in series with terminals 24 and rectifier 26 and are current sensitive windings. The resultant voltage across secondary winding 74A, which is induced by winding 70A, will be greater than the voltage across secondary winding 74B which is induced by winding 70B. This, in turn, will cause the current through resistances 76A and 78A to be greater than the current through 76B and 78B. The voltage between terminals 80A and 82A of rectifier 84A will be greater than the voltage between terminals 80B and 82B of rectifier 84B. This will cause current to flow from terminal 82A through junction 86, through resistance 88, through rectifier 84A, through junction 90, through resistance 92 and through rectifier terminal 80A to complete its circuit. In addition, current will also flow from terminal 82A through junction 86, through paralleling relay contacts 62B, through junction 66B, which is located between resistances $R_6$ and $R_7$, through resistance $R_6$, through resistance $R_1$, through junction 66A, through paralleling relay contacts 62A, through junction 90, through resistance 92, and through rectifier terminal 80A to complete its circuit. As previously shown, the current through resistance $R_6$ is in a direction to increase the voltage drop across resistance $R_6$. This will reduce the voltage drop between junctions 48B and tap 46B which, in turn, will raise the output of the alternator 20B. In addition, the current through resistance $R_1$ is in a direction to decrease the voltage drop across resistance $R_1$ and opposes the normal current flow through the divider composed of resistances $R_3$, $R_2$ and $R_1$. This action will increase the voltage drop between junctions 48A and 46A which will cause diode 44A to increase its conduction and reduce the output of the alternator 20A. When the outputs of the two alternators 20A and 20B are nearly equal, only a small potential difference between junctions 86 and 90 will exist. This steady state or balanced condition will insure a practically equal division of load between the two alternators.

If the regulator and alternator 20B were supplying most of the load, then above procedure would be reversed with current from the paralleling circuit in resistance $R_1$ and $R_6$ being reversed. If the units were supplying an equal amount of the load, then the potential difference between junctions 86 and 90 would be zero resulting in no paralleling action.

The functions of the paralleling relay contacts 62A and 62B have been previously described. Thus, when only one alternator is operating, then only one set of paralleling relay contacts are closed and no paralleling action will occur. (The paralleling circuit is not completed until both sets of paralleling relay contacts are closed.) The paralleling relays are designed to close when their respective alternator has built up to a predetermined output voltage which is just below its rated voltage.

It is to be noted the circuits described will maintain the outputs of the paralleled alternators substantially equal. When two alternators are connected as shown in the drawing, the output voltages at the rectifiers will be equal, but the output currents may differ considerably. The output of the alternator is a function of both the current and the voltage. The regulator circuits which include resistances $R_1$, $R_2$, $R_3$, $R_6$, $R_7$ and $R_8$ are essentially responsive to the voltage across leads 25 and 27. These regulators by taps 46 may be adjusted to maintain the voltages across these leads at any predetermined level. Thus, as the entire circuit network is responsive to both voltage and current, the output of the alternators will be maintained substantially constant and equal at a predetermined level.

It has been pointed out that a transistor becomes conductive when a voltage difference exists and the amount of conduction of a transistor is dependent on the amount of voltage difference. However, when the voltage impressed across a transistor is very small, the transistors will not conduct. Thus, a predetermined output difference must exist in order that the paralleling circuits may function. This difference will vary and will depend upon the characters of the transistors used and we have found a difference of 0.1 volts or more will cause the paralleling circuit to operate. When more than this difference exists the output of the two alternators will be brought closer together until a steady state or balanced condition exists. However, the small difference in output will remain after the paralleling control transistors cease to be conductive.

While the embodiments of the present invention as herein disclosed constitute preferred forms, it is to be understood that other forms might be adopted.

What is claimed is as follows:

1. A circuit net work for equalizing the outputs of a pair of variable speed alternators, each having an energizing field winding and each connected having an output circuit connected for parallel operation to a direct current circuit through a rectifier, comprising; a voltage regulator means including a voltage sensitive diode connected in circuit with the output of each rectifier and in circuit with a respective field winding which the regulator is to control, and means including a pair of rectifiers interconnected with each other and with the diodes of the regulators which control the field windings of said pair of alternators.

2. A circuit network for equalizing the outputs of a pair of variable speed alternators, each having an energizing field winding and each connected having an output circuit connected for parallel operation to a direct current circuit through a rectifier, comprising; a voltage regulator means including a voltage sensitive diode connected in circuit with the output of each rectifier and in circuit with a respective field winding which the regulator is to control, and means including a pair of rectifiers interconnected with each other and with the diodes of the regulators which control the field windings of said pair of alternators, and a transformer in the output circuits of each alternator each connected with one of said pair of rectifiers for supplying power to the rectifier connected therewith in proportion to current flow in said output circuit.

3. In a circuit network, the combination comprising; a pair of alternators each having output terminals and an exciting winding, a first pair of rectifiers each connected with the output terminals of said alternators and connected together to supply a common direct current load circuit, an individual voltage regulating means for each alternator including a voltage sensitive diode and a means including a second pair of rectifiers in circuit with the output terminals of said alternators and with the diodes of said regulating means and with said exciting winding for varying the voltage drops across both of said diodes in response to a difference in output of said alternators, whereby said exciting windings are energized in proportion to said output difference.

4. In a circuit network, the combination comprising; a pair of variable speed alternators each having output terminals and an exciting field winding, a voltage regulating means for each alternator including a voltage sensitive diode connected in circuit with said output terminals and with said field for varying the energization of the field in response to the output of said alternator, and means including a pair of rectifiers in circuit with the output terminals of said alternators having a common output circuit in circuit with the diodes of said voltage regulating means for varying the voltage drop across said diodes in response to a difference in output of said alternators.

5. In a circuit network, the combination comprising a pair of variable speed alternators each having output terminals and an exciting field winding, a transistorized voltage regulating means for each alternator including a voltage sensitive diode connected in circuit with said output terminals and with said field for varying the energization of said field in response to the output of said alternator, and means including a transformer and rectifier connected in circuit with the output terminals of each of said alternators, said rectifiers being connected in circuit with each other and with the diodes of the regulating means for both alternators for varying the voltage drop across the diodes in response to an output difference of said alternators.

6. In a circuit network, the combination comprising; a pair of variable speed alternators each having output terminals connected through a rectifier to supply a common direct current load and having an exciting field winding, a transistorized voltage regulating means for each alternator including a voltage sensitive diode connected in circuit with said output terminals and with said field for varying the energization of said field in response to the output of said alternator, and means including a transformer and a second rectifier connected in circuit with the output terminals of each of said alternators, and connected in circuit with each other and with the diodes of the regulating means for both alternators for varying the voltage drop across the diodes in response to an output difference of said alternators.

7. In a circuit network, the combination comprising a pair of variable speed alternators each having output terminals connected through a rectifier to supply a common direct current load and having an exciting field winding, a transistorized voltage regulating means for each alternator including a voltage divider and voltage sensitive diode connected in circuit with said output terminals and divider and responsive to the potential drop across a portion of said divider and with said field for varying the energization of said field in response to the output of said alternator, and means including a transformer and a second rectifier connected in circuit with the output terminals of each of said alternators, and connected in circuit with each other and with the voltage dividers of the regulating means for both alternators for varying the voltage drop across the diodes in response to an output difference of said alternators.

8. In a circuit network, the combination comprising; a pair of alternators each having output terminals and an exciting field winding, a first load rectifier for each alternator connected to the output terminals thereof and to a common direct current load circuit, a voltage regulator for each alternator connected in circuit with said output terminals and arranged to vary the excitation of the field of the alternator associated therewith to maintain the output voltage of the alternator substantially at a predetermined constant value, each of said voltage regulators including; a voltage divider and means including a voltage sensitive diode, at least one transistor arranged to be conductive when the voltage drop across said diode exceeds a predetermined value and a rectifier connected with said output terminals and voltage divider for supplying rectified current to said divider from said output terminals, and a means including a second pair of rectifiers each of which is connected in circuit with output terminals of one of said alternators and connected to each other and in circuit with said voltage dividers for varying the voltage drop across a portion of said dividers whenever the output of said alternators differs by a predetermined amount.

9. In a circuit network, the combination comprising; a pair of alternators each having output terminals and an exciting field winding, a first load rectifier for each alternator connected to the output terminals thereof and to a common direct current load circuit, a voltage regulator for each alternator connected in circuit with said output terminals and arranged to vary the excitation of the field of the alternator associated therewith to maintain the output voltage of the alternator substantially at a predetermined constant value, each of said voltage regulators including; a voltage divider and means including a voltage sensitive diode, at least one transistor arranged to be conductive when the voltage drop across said diode exceeds a predetermined value and a rectifier connected with said output terminals and voltage divider for supplying rectified current to said divider from said output terminals, and a means including; a pair of transformers each of which is directly connected with the output terminals of one of the alternators and a second pair of rectifiers each of which is connected with one of said transformers and with each other, said second rectifiers being also connected in circuit with said voltage dividers for varying the voltage drop across at least a portion of said dividers whenever the output of said alternators differs by a predetermined amount.

10. A circuit network for proportioning the load carried by a pair of parallel connected alternators each having an energizing field winding comprising, a pair of rectifiers having input terminals connected respectively to respective output terminals of said alternators and having output terminals connected together to form a pair of direct current output terminals, voltage regulating means for each alternator each including a voltage sensitive diode connected in circuit with each field winding for controlling the energization thereof, and each including a voltage divider connected in circuit with each voltage sensitive diode and across said direct current output terminals, and means responsive to the load carried by each generator for applying a control voltage to a respective voltage divider whereby the energization of said field windings is controlled by said control voltages.

11. A circuit network for proportioning the load carried by a pair of parallel connected alternators each having an energizing field winding comprising, a pair of rectifiers having input terminals connected respectively to respective output terminals of said alternators and having output terminals connected together to form a pair of direct current output terminals, voltage regulating means for each alternator including a voltage sensitive diode connected in circuit with a transistor for controlling the conduction of said transistor, means connecting each transistor in circuit with a respective alternator field winding whereby the transistors control the energization of the field windings, a pair of voltage dividers connected across said direct current output terminals and in circuit with respective voltage sensitive diodes for applying voltages across said diodes, and means for applying control voltages to said voltage dividers corresponding to the difference in load carried by said alternators.

References Cited in the file of this patent

UNITED STATES PATENTS 2,751,550    Chase _____ June 19, 1956

FOREIGN PATENTS 653,994    Great Britain _____ May 30, 1951